United States Patent
Chang et al.

(10) Patent No.: US 7,023,784 B2
(45) Date of Patent: Apr. 4, 2006

(54) ENCODING METHOD FOR RECORDING DATA ON COMPACK DISK

(75) Inventors: Wen-Jeng Chang, Hsin Tien (TW); Kun-Long Lin, Hsin Tien (TW)

(73) Assignee: Via Technologies, Inc., Taipei Hsien (TW)

(*) Notice: Subject to any disclaimer, the term of this patent is extended or adjusted under 35 U.S.C. 154(b) by 261 days.

(21) Appl. No.: 10/400,574

(22) Filed: Mar. 28, 2003

(65) Prior Publication Data
US 2003/0185129 A1    Oct. 2, 2003

(30) Foreign Application Priority Data
Mar. 29, 2002    (TW) .............................. 91106426 A

(51) Int. Cl.
*G11B 7/00* (2006.01)

(52) U.S. Cl. ................................... 369/59.25

(58) Field of Classification Search ............... 369/47.1, 369/47.28, 47.27, 59.23, 59.24, 59.25
See application file for complete search history.

(56) References Cited

U.S. PATENT DOCUMENTS 6,269,059 B1 *    7/2001    Kuroda et al. ........... 369/47.28

* cited by examiner

*Primary Examiner*—Nabil Hindi
(74) *Attorney, Agent, or Firm*—Birch, Stewart, Kolasch & Birch,LLP

(57) ABSTRACT

An encoding method for recording gap regions or sectors having repeated data is disclosed. At least one sector is entirely encoded and stored in a memory buffer of the optical recording system. If the currently encoded are gap regions or sector having repeated data embedded in the fields of user data, only those portions affected by the modified header will be encoded to derive associated P code and Q code. The error detection code is firstly generated in the mode 1 standard when a gap region is encoded. P code is then encoded for those regions affected by the sequentially modified header and error detection code, while associated Q code is then derived according the modified header, error detection code, and P code. In the mode 2 form 1 and mode form 2 standards, only those regions affected by the sequentially modified header should be re-encoded again. Since the remaining portions employ the same data as the last encoded one in the memory buffer so that the encoding performance would be significantly upgraded whatever encoding standards are employed.

22 Claims, 4 Drawing Sheets

ENCODING METHOD FOR RECORDING DATA ON COMPACK DISK

BACKGROUND

1. Field of the Invention

The present invention is related to an encoding method for recording data on a compact disk (CD), and more particularly, to an encoding method that can efficiently upgrade the data encoding performance when an optical recording system records gap regions or sectors including repeated data onto a compact disk.

2. Background of the Invention

Recently, optical disks become an important and popular storage media for holding a huge volume of data. Generally, the data that is ready to be recorded onto a compact disk is divided and encoded into a plurality of sectors by following standard formats such as the sector structures shown in FIGS. 1 to 3. In these figures, the unit of data is byte, and there are 2352 bytes included in a sector. FIG. 1 is a schematic diagram of the first encoding form (e.g., mode 1 standard), which is adapted to encode data for application software. FIGS. 2 and 3 respectively show the second encoding form (e.g., mode 2 form 1 standard) and the third encoding form (e.g., mode 2 form 2 standard) that both of them are adapted for encoding video/audio data.

The conventional encoding method is described by making reference with FIG. 1. A host such as a personal computer (PC) firstly transfers a user data 13 having 2048 bytes to an optical recording system, e.g. a compact disk-recordable (CD-R) drive or a compact disk-rewritable (CD-RW) drive. The optical recording system then generates a synchronous code 11 and a header 12 for the user data 13, while an error detection code 14 (EDC) is generated according to the synchronous code 11, header 12, and the user data 13. Sequentially, after a zero code 15 is attached (with 4-byte length), an error correction code 16 (ECC) is next generated according to the header 12, user data 13, EDC 14, and the zero code 15. The first encoding form (or the C3 encoding procedure) is completed when the above encoding procedure terminates, wherein the ECC 16 includes a P code 161 (P-parity check code) and a Q code 162 (Q-parity check code). Sequential encoding procedures, including C2 and C1 encoding procedures, are then performed to the complete encoded data under the mode 1 standard.

Sometimes the optical recording system will record so-called gap regions on the compact disk within the data recording procedures. For example, when an audio or music CD is recording, the optical recording system may record a lot of gap regions (e.g., 2 seconds, about 150 gap regions) adjacent to a just recorded song before recording another one. Besides, if the so-called buffer-under-run occurs during data recoding operations, the optical recording system will also record gap regions on the current compact disk and wait for the data stored in buffers reaches to a predetermined threshold again. In comparison with a normal sector, these gap regions usually contain repeated information (e.g., all bit 0's) stored therein, and contents of the gap regions will be repeated except the header 12, 22 and 32, the EDC 14, 25 and 35, and the ECC 16 and 22.

As shown in FIG. 1, when a sector is being encoded, the ECC 16 will be generated according the header 12, user data 13, EDC 14 and zero code 15, while the ECC 26 will be derived according to the user data 24 and EDC 25 as shown in FIG. 2. However, since the the user data 13, 24 and 34 occupy most of the entire sector portions and they usually store repeated data as mentioned above, the conventional approach is obvious an inefficient way for encoding information due to a time-cost as well as resource-cost approach is employed for the optical recording system.

Accordingly, the aforementioned conventional encoding scheme obviously includes many disadvantages waiting for further improvements. The present invention therefore discloses a solution for overcoming these disadvantages of the prior art scheme.

SUMMARY OF THE INVENTION

The principal object of the present invention is to provide an encoding method for recording data on a compact disk so that the encoding efficiency can be significantly upgraded than before.

In the preferred embodiment, the disclosed method provides an encoding method adapted for recording gap regions or sectors having repeated data that these repeated data are not always entirely encoded so as to upgrade encoding efficiency.

In accordance with the present invention, the optical recording system will encode at least one gap region or sector having repeated data firstly. The non-repeated portions such as the headers of the following gap regions or sectors in memory buffer of the optical recording system are then modified. Encoding procedures are then actuated for those portions affected by the modified header, while those unaffected portions are not encoded again since the unaffected ones in the memory buffer are not changed during the encoding procedures. The current encoded sector or gap region is then delivered to actuate following encoding procedures before being recorded onto a compact disc In the embodiment, when header is modified in the memory buffer under the mode 1 standard when gap regions are encoded, the error detection code will be changed according to the modified heard simultaneously. The optical recording system then only encodes those portions affected by the modified header and error detection code. In another embodiment, since only the header changes as different gap regions in the mode 2 form 1 standard and the mode 2 form 2 standard, only those portions affected by the modified headers will be encoded by the optical recording system. Total time-cost regarding the encoding procedures will be significantly reduced since the bus bandwidths for accessing data is significantly reduced.

Numerous additional features, benefits and details of the method of the present invention are described in the detailed description which follows.

Table 1 is a coding table of the first encoding form 1.

Table 2 is a coding table of the Q code of the first encoding form 1.

DETAILED DESCRIPTION OF THE PREFERRED EMBODIMENT

Figure 1:
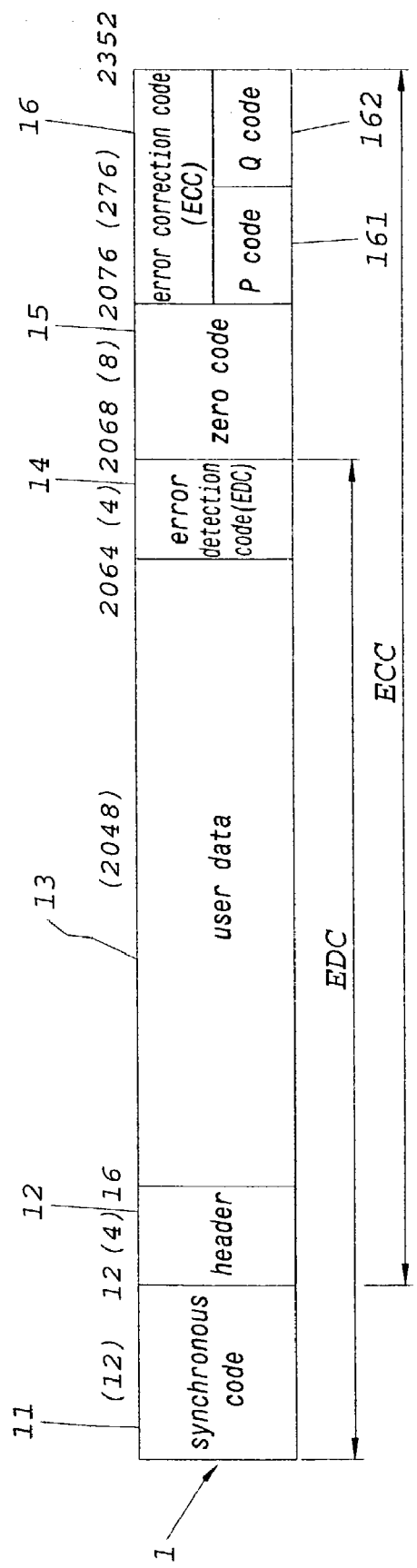
FIG. 1 is a diagram of the first encoding form.

Please refer to FIG. 1 and by making reference to Tables 1 and 2. Table 1 is the coding table of the mode 1 standard (the sync code 11 of the first encoding form is not included in Table 1), while Table 2 is the coding table of the Q code 162 of the mode 1 standard. The word addresses (a word is composed of two bytes) are respectively marked as 0~1169 in Table 1, and the contents of the first encoding form is mapped into Table 1 orderly. For example, the header 12 is stored in words 0~1, the user data 13 employs 1024 words 2~1025 for storing purpose, the error detection code 14 is stored in words 1026~1027, while the fields of words 1028~1031 is used to store zero code 15. Furthermore, the P code 161 and the Q code of the error correction code 16 are respectively stored in words 1032~1117 and 1118~1169.

Since all information of the gap regions is stored into memory buffer of the optical recording system for encoding purpose, the operating flows of the embodiment are described based on the memory buffer in the following paragraphs. The first embodiment demonstrates the operating flows when the optical recording system encodes data under the mode 1 standard. During the operation of recording data onto a compact disk, the optical recording system will encode whole portions of the first sector (or, at least one sector stored in the memory buffer currently). Thereafter, the optical recording system will generate a synchronous code 11 and a header 12 for the user data 13, while an error detection code 14 (EDC) is then derived according to the synchronous code 11, header 12, and the user data 13 when the mode 1 standard is followed. If gap regions are currently encoded, only the header 12 of the first sector (which indicates the first gap region now) will be changed (in fact, the content of header 12 will plus an integer one to indicate the header of the next gap region), which will also affect the error detection code under the mode 1 standard. Accordingly, the optical recording system will partially encode the next gap region to those non-repeated potions (or affected portions), e.g. those portions affected by the modified header 12 (such column and rows including information regarding the modified header 12, EDC 14 and P code 161 under the mode 1 standard). All gap regions are encoded by following the aforementioned steps so that encoding efficiency will be significantly upgraded since most of the entire sectors do not need to be repeatedly encoded except the first gap region. On the other hand, if the currently encoded sector are not gap region, error correction code (ECC) 16 including P code and Q code are then derived by the optical recording system based on header 12, user data 13, EDC 14, and zero code 15. Please note that the optical recording system may employ the disclosed method of the embodiments for encoding sectors having repeated data embedded in their user data 13 in order to decrease required time-cost regarding encoding procedures. Any ordinary person having skills in the art may modify the embodiment as applications but all similar rearrangements and modifications within the spirits of the embodiment should included in the appended claims.

The first encoding operation when encoding sectors having non-repeated data (i.e., non-repeated data in their fields of user data 13) is described as follows. Please refer to Table 1 firstly. The optical recording system will generate P code 161 according to the data stored in rows R0~23, while the derived P code is then stored into rows R24~25 Taking column C0 as an example (the other columns will be manipulated in the same way), the optical recording system will encode the data in addresses 0, 43, 86 . . . 989 to derive corresponding parity check codes before storing in addresses 1032 and 1075.

Please now refer to Table 2. The optical recording system will generate Q code 162 according to the data in column C'0~C'42 after P code 161 is derived, while the derived Q code 162 is then stored into column C'43~44. Taking column R'0 as an example (the other rows will be encoded as the same manner), the optical recording system will encode the data in addresses 0, 44, 88 . . . 730 to generate corresponding parity check codes, while the derived parity check codes are then stored in addresses 1118 and 1144.

On the other hand, the second encoding operation when encoding gap regions or sectors having repeated data is described as follows. The optical recording system will firstly detect whether the gap region or sector encompasses repeated information or not. Please note that the gap regions basically including repeated data stored therein, this detection will be a step for guarantee purpose. If the detected sector or gap region is not a repeated one, the first encoding operation will be performed, otherwise the optical recording system will perform the second encoding operation to generate the error correction code 16 for those portions unaffected by the modified header 12.

Taking the first encoding form as an example. Since the header 12 in addresses 0~1, the error detection code 14 in addresses 1026~1027 and their corresponding parity check codes in addresses 1032, 1033, 1069, 1070, 1075, 1076, 1112 and 1113 are changed in the memory buffer when recording gap regions under mode 1 standard, the optical recording system only have to encode those portions affected by the above addresses during the second encoding operation.

For the sake of clarity, the encoding procedures of those portions affected by the modified header 12 are described further in the following.

(a) Firstly, the optical recording system generates the P code 161, according to the header 12 and the error detection code 14. Referring to Table 1, since there are columns C0, C1, C37 and C38 include the information regarding modified header 12 and EDC 14, the optical recording system generates the parity check codes for the data in columns C0, C1, C37 and C38 and then stores the derived parity check codes in addresses 1032, 1033, 1069, 1070, 1075, 1076, 1112 and 1113. Taking column C0 for example, the optical recording system will generate parity check codes according to the data in addresses 0, 43, 86 . . . 989, while these parity check codes are then stored into the addresses 1032 and 1075.

(b) The optical recording system generates the Q code 162 according to the header 12, the error detection code 14 and the P code 161 since modifications to P code 161 will cause modifications to Q code 162 simultaneously. Referring to Table 2, the optical recording system generates the Q code 162 according to the data in eight rows R'0, R'11, R'12, R'13, R'14, R'23, R'24 and R'25 and then stores the generated parity check codes in addresses 1118, 1129, 1130, 1131, 1132, 1141, 1142, 1143, 1144, 1155, 1156, 1157, 1158, 1167, 1168 and 1169, respectively. Taking row R'0 for example, the optical recording system generates parity check codes for the data in addresses 0, 44, 88 . . . 730 and then stores these parity check codes into the addresses 1118 and 1144. As known by an ordinary person having skills in the art, the modified header 12 will directly affect two rows by itself, and simultaneously affect two rows regarding the EDC 14 under the mode 1 standard. Since the P code 161 and Q code 162 will be affected to vary their currently stored values by the modified header 12 and EDC 14, eight additional rows are changed and need to be encoded in the embodiment. Finally, only aforementioned eight rows require to be encoded since some overlapped rows must be eliminated.

Figure 2:
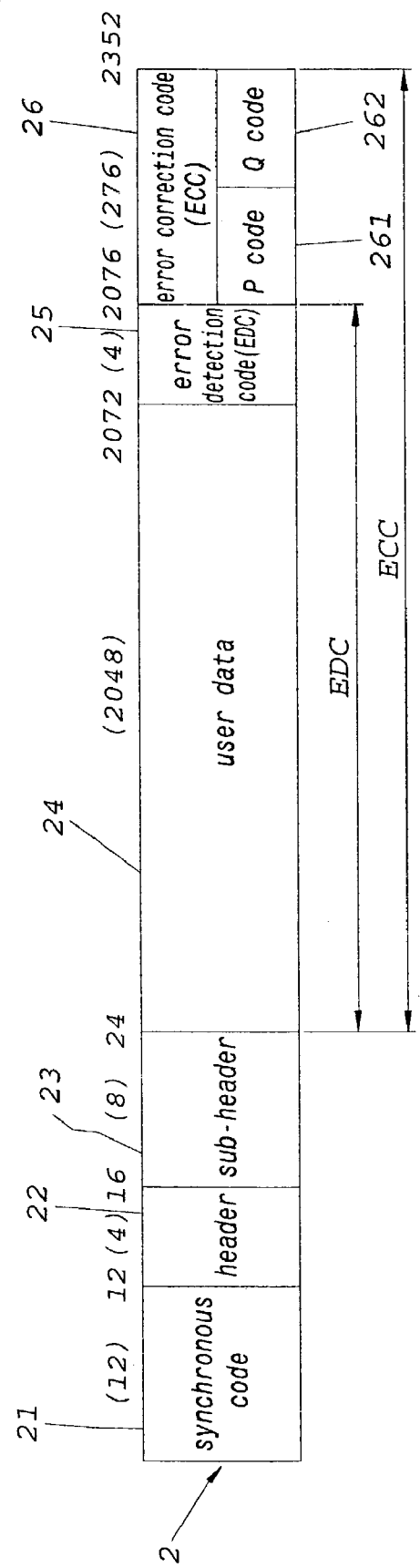
FIG. 2 is a diagram of the second encoding form.
Figure 3:
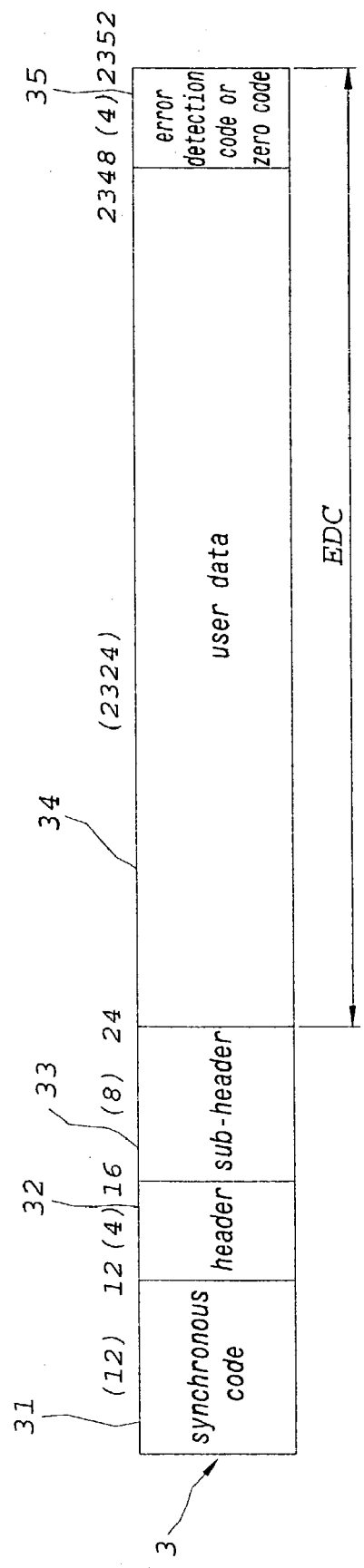
FIG. 3 is a diagram of the third encoding form.
Figure 4:
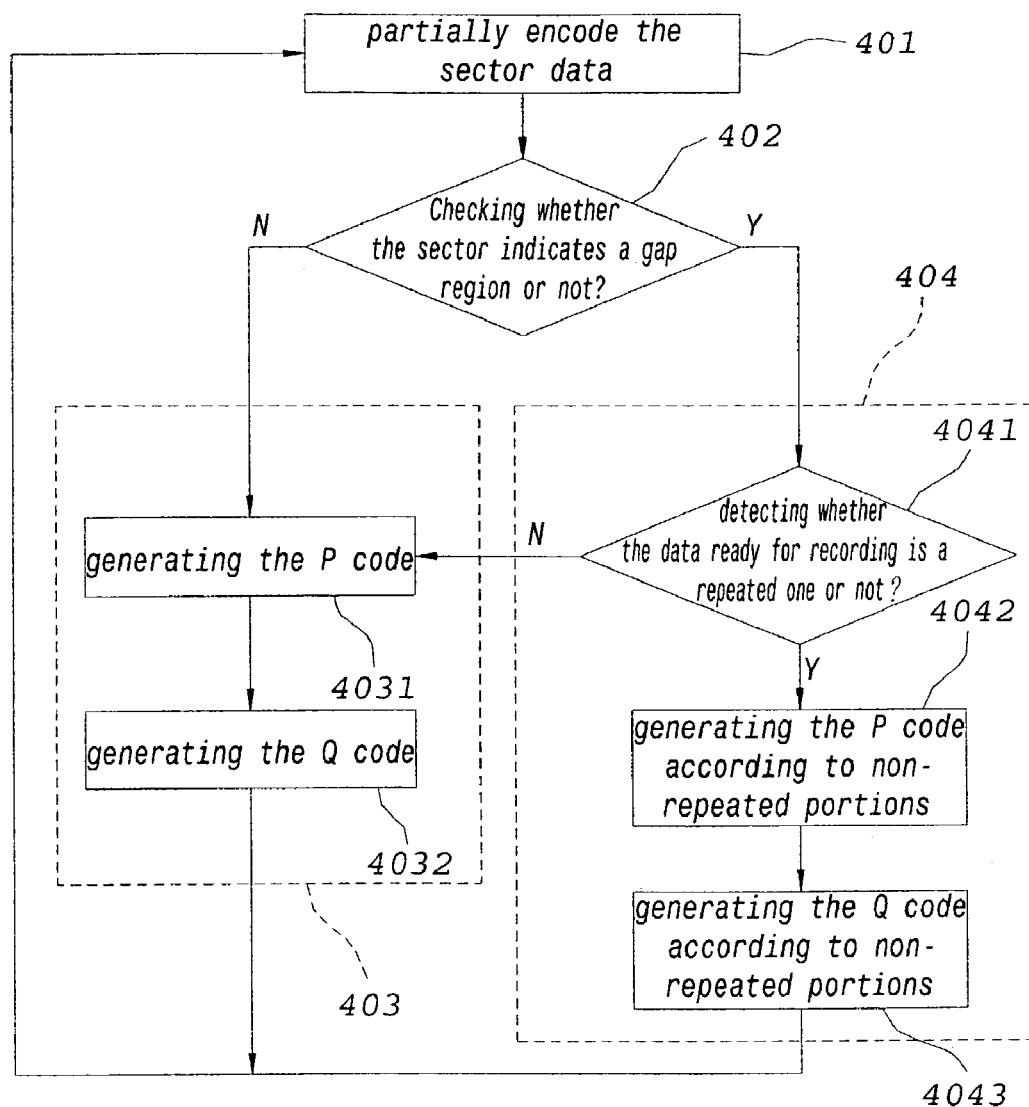
FIG. 4 is a flow chart of the preferred embodiment according to the present invention.

Please now refer to FIGS. 1 and 4 and by making reference to Tables 1 and 2, wherein FIG. 4 is a flow chart of the encoding method in accordance with the present invention. The encoding method of the present invention includes those steps as follows. Please note that the method described below is an embodiment of the present invention according to the mode 1 standard as shown in FIG. 1. However, in practice, this method also can apply to mode 2 form 1 and the mode 2 form 2 standards respectively shown in FIGS. 2 and 3, which may bring more encoding efficiency than that of the mode 1 standard. Detailed descriptions regarding the use of mode 2 form 1 and mode 2 form 2 standards are given later.

Step 401: During data recording operations, the optical recording system will encode the ready-for-encoding sector in the memory buffer to derive EDC 14 firstly. Of course, at least one sector (whether a gap region or a normal sector) should be encoded by using whole sector data. For example, there may create memory buffer having enough spaces to store three sectors in practical implementations, and the optical recording system will perform encoding procedures to all these three sectors before the operating flow of FIG. 4 starts. Please note that only the headers 12 of the three gap regions are different since they are given by sequential numerals, e.g. 00000001h, 00000002h, 00000003h are given for these three gap regions. The optical recording system will modify the header 00000001h of the first gap region to be 00000004h for the purpose of indicating the fourth gap region after the first gap region has been delivered to arisen the following C2 and C1 encoding procedures. Similarly, the fifth and sixth gap regions may be encoded by respectively modifying the header 00000002h and 00000003h to be 00000005h, 00000006h after the second and third gap regions being delivered. An artisan having ordinary skills in the art may modify the embodiment as requirements and applications.

Step 402: The optical recording system then check whether the next sector ready for recording indicates a gap region (or a sector having repeated data) or not. This step will be one for achieving the guarantee purpose as above-mentioned when encoding gap regions. Based on decision result, the optical recording system performs the following Step 403 if the next sector data does not indicate a gap region, otherwise the following Step 404 will be performed if a gap region is going to be encoded.

Step 403: A first encoding operation is performed, which also includes Steps 4031 and 4032 as follows.

Step 4031: Referring to Table 1, the optical recording system will perform an encoding operation to derive the P code 161 according to related portions of the encoding format in Table 1. In other words, the data in columns C0~C42 are sequentially encoded along the direction indicated by rows R0~R23, while the generated parity check codes are then stored in rows R24~25 Taking column C0 as an example (of course the other columns will be encoded as the same manner), the optical recording system will encode the data in addresses 0, 43, 86 . . . 989 and generate corresponding parity check codes that are stored in addresses 1032 and 1075 as mentioned above.

Step 4032: Referring to Table 2, the optical recording system would generate the Q code 162. Taking column R'0 as an example, the optical recording system will encode the data mapped to addresses 0, 44, 88 . . . 730 and generate a corresponding parity check code stored in addresses 1118 and 1144. The encoding procedure of the embodiment is complete after this step terminates, while the optical recording system returns to Step 401 for encoding the successive sectors or gap regions.

Step 404: The optical recording system will execute the second encoding operation, which can be divided into separate Steps 4041, 4042 and 4043 described as follows.

Step 4041: By comparing with the former encoded data, the optical recording system will firstly detect whether the ready-for-encoding sector or gap region encompasses repeated data or not. This step may be eliminated or remained for confirmation purpose as applications since the optical recording system understands whether the currently encoding sector is a gap region (or a sector having repeated data stored in the filed of user data 13) or not. The optical recording system will switch to Step 4031 to perform the first encoding operations if the current encoding sector or gap region does not include repeated data. Otherwise the optical recording system will go on the following Step 4042.

Step 4042: The optical recording system generates the parity check code, i.e., the P code 161, according to those non-repeated portions (or "affected" portions) that are affected by the modified header 12 and EDC 14. Please now refer to Table 1, the optical recording system generates the parity check code according to the data mapped to columns C0, C1, C37 and C 38 and stores the generated parity check code in addresses 1032, 1033, 1069, 1070, 1075, 1076, 1112 and 1113. Taking column C0 for example, the optical recording system will generate a parity check code mapped to addresses 1032 and 1075 according to the data mapped to addresses 0, 43, 86 . . . 989. Moreover, the optical recording system will generate the parity check code of the P code 161 corresponding to the repeated portions by copying that of the former encoding data.

Step 4043: The optical recording system generates the Q code 162 according to the non-repeated portions affected by the modified header 12 and EDC 14. Please note that only the header 12 mapped to addresses 0~1, the EDC 14 mapped to addresses 1026~1027 and their corresponding parity check code (P code) mapped to addresses 1032, 1033, 1069, 1070, 1075, 1076, 1112 and 1113 are non-repeated portions here. Please refer to Table 2 now, the optical recording system will generate the Q code 162 according to the data mapped to rows R'0, R'11, R'12, R'13, R'14, R'23, R'24 and R'25 and then stores the generated parity check code in Addresses 1118, 1129, 1130, 1131, 1132, 1141, 1142, 1143, 1144, 1155, 1156, 1157, 1158, 1167, 1168 and 1169. Taking row R'0 for example, the optical recording system will generate a parity check code mapped to addresses 1118 and 1144 according to the data in addresses 0, 44, 88 . . . 730. Moreover, the optical recording system does not need to generate Q code 162 for those repeated portions since the Q code 162 regarding the repeated portions has been calculated and stored in the memory buffer already when encoding the first gap region. The second encoding operation is complete when this step terminates and the current encoded gap region can be delivered for recording onto a compact disc. Finally the optical recording system returns to Step 401 for encoding the sequential gap regions.

Since the encoding method of the present invention only encodes the non-repeated portions of the gap region, time-cost for encoding the gap region will be effectively reduced so that the data encoding efficiency can be significantly upgraded due to the system resource being efficiently used. In another embodiment, there is no additional portion in the memory buffer affected by the modified headers 22 and 32 under the mode 2 form 1 and mode 2 form 2 standards, respectively. In other words, the EDC 25 and ECC 26 in the mode 2 form 1 standard, and the EDC 35 in the mode 2 form 2 standard will remains the same as the former encoded results when only the header is modified. Therefore, only those portions related to the headers require to be encoded by the optical recording system, that is, only those rows and columns that include the modified header need to be encoded in these two embodiment. Totally encoding time will be significantly reduced since the bus bandwidths for accessing data will be significantly reduced whatever mode 1, mode 2 form 1, or mode 2 form 2 standards are employed.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A method for encoding data ready-for-recording on a compact disk, wherein said ready-for-recording data comprises a plurality of data sectors and each of said data sector having a header and a user data, said method comprising:
    encoding first sector of said plurality of data sectors;
    modifying said header of a second data sector of said plurality of data sectors, said second data sector being succeeding to said first data sector;
    partially encoding said second data sector by encoding an affected portion of said second data sector according to said modified header when said second sector having said user data identical to that of said first sector, wherein a portion of said second data sector that is not affected by said modified header is not varied when said affected portion is encoded; and
    encoding said second sector by using entire data of said second sector when said second sector has user data non-identical to that of said first sector.

2. The encoding method as claimed in claim 1 wherein said affected portion is varied with said modified header.

3. The encoding method as claimed in claim 2 wherein an encoding form for recording said optical disk is the mode 1 standard.

4. The encoding method as claimed in claim 1 wherein said modified header modified according to a relationship between said first sector and said second sector.

5. The encoding method as claimed in claim 4 wherein said affected portion comprises a row including information being modified by said modified header and a column including information being modified by said modified header.

6. The encoding method as claimed in claim 4 wherein said affected portion comprises an error detection code being modified according to said modified header.

7. The encoding method as claimed in claim 4 wherein said affected portion comprises an error correction code being modified according to said modified header.

8. The encoding method as claimed in claim 1 wherein said ready-for-recording data indicates a gap region when all of said user data in said plurality of data sectors are identical.

9. The encoding method as claimed in claim 1 wherein portion of said second data sector that is not affected by said modified header remains the same in a memory buffer of an optical recording system when encoding said second data sector.

10. A method of encoding a plurality of data sectors having identical user data before an optical recording system records said sector onto a compact disk comprising:
    encoding a first sector of said plurality of data sectors, wherein each one of said plurality of data sectors having a header;
    modifying said header of a second data sector of said plurality of data sectors, said second data sector being succeeding to said first data sector;
    partially encoding said second data sector by encoding an affected portion of said second data sector according to said modified header, wherein a portion of said second data sector that is not affected by said modified header is not varied when said affected portion is encoded.

11. The encoding method as claimed in claim 10 wherein said affected portion is varied with said modified header.

12. The encoding method as claimed in claim 10 wherein an encoding form for recording said optical disk is the mode 1 standard.

13. The encoding method as claimed in claim 12 wherein said affected portion comprises a row including information being modified by said modified header and a column including information being modified by said modified header.

14. The encoding method as claimed in claim 12 wherein said affected portion comprises an error detection code being modified according to said modified header.

15. The encoding method as claimed in claim 14 wherein said affected portion comprises an error correction code being modified according to said modified header.

16. The encoding method as claimed in claim 15 wherein said currently encoded sector follows a standard adapted to encode application software.

17. The encoding method as claimed in claim 10 wherein said ready-for-recording data indicates a gap region when all of said user data in said plurality of data sectors are identical.

18. The encoding method as claimed in claim 10 wherein said portion of said second data sector that is not affected by said modified header remains the same in a memory buffer of an optical recording system when encoding said second data sector.

19. A method for encoding a gap region ready-for-recording onto a compact disk, wherein said gap region comprises a plurality of data sectors and each of said data sectors having a repeated user data identical to said other data sectors and a header that is non-identical to said other data sectors, said method comprising:
    encoding a first sector of said plurality of data sectors according to said repeated user data and said non-repeated portion;
    modifying said header of a second data sector of said plurality of data sector according to a relationship between said first sector and said second data sector, said second data sector being succeeding to said first data sector;
    encoding an affected portion of said second data sector according to said modified header, wherein said affected portion is varied with said modified header; and
    encoding said second data sector according to an encoding form said compact disk being employed.

20. The encoding method as claimed in claim 19 wherein said step of encoding said affected portion of said second data sector comprises a step of encoding an error detection code of said second data sector according to a synchronous code of said second data sector, said modified header, and said identical user data when said encoding form is the mode 1 standard.

21. The encoding method as claimed in claim 19 wherein a non-affected portion of said encoded result of said first sector remains the same when encoding said gap region.

22. The encoding method as claimed in claim 19 wherein said step of encoding said affected portion of said second data sector skipped when said encoding form is the mode 2 standard.

* * * * *